US012039929B2

(12) United States Patent
Jo et al.

(10) Patent No.: US 12,039,929 B2
(45) Date of Patent: Jul. 16, 2024

(54) DISPLAY DEVICE

(71) Applicant: LG Display Co., Ltd., Seoul (KR)

(72) Inventors: JaeHyung Jo, Goyang-si (KR); YoungMin Jeong, Paju-si (KR); ByungSam Min, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/953,060

(22) Filed: Sep. 26, 2022

(65) Prior Publication Data

US 2023/0197000 A1 Jun. 22, 2023

(30) Foreign Application Priority Data

Dec. 21, 2021 (KR) ........................ 10-2021-0184212

(51) Int. Cl.
*G09G 3/3233* (2016.01)
*G09G 3/20* (2006.01)
(Continued)

(52) U.S. Cl.
CPC ......... *G09G 3/3233* (2013.01); *G09G 3/2007* (2013.01); *G09G 3/2096* (2013.01); *G09G 3/3208* (2013.01); *G09G 3/3258* (2013.01); *G09G 3/3291* (2013.01); *G09G 2300/0819* (2013.01); *G09G 2300/0842* (2013.01); *G09G 2310/0286* (2013.01); *G09G 2310/08* (2013.01);
(Continued)

(58) Field of Classification Search
CPC ......... G09G 3/3233; G09G 2320/0233; G09G 2320/045; G09G 2300/0842; G09G 2300/0819; G09G 2340/0435; G09G 2320/0626; G09G 2320/0242; G09G 3/3208; G09G 2310/061; G09G 3/3258; G09G 3/3291; G09G 3/2096; G09G 3/2007; G09G 2310/0286
See application file for complete search history.

(56) References Cited

U.S. PATENT DOCUMENTS 11,631,375 B2 * 4/2023 Liu .......................... G09G 5/10 345/204
2012/0026146 A1 * 2/2012 Kim ..................... G09G 3/3233 345/78
(Continued)

FOREIGN PATENT DOCUMENTS

KR 10-2019-0140760 A 12/2019

*Primary Examiner* — Dismery Mercedes
(74) *Attorney, Agent, or Firm* — Birch, Stewart, Kolasch & Birch, LLP

(57) ABSTRACT

A display device can include a display panel including a plurality of pixels configured to be driven in one of a driving period and a blank period, a timing controller configured to output a variable refresh rate (VRR) signal determining a refresh rate of the plurality of pixels and a video data signal, and a data driver configured to supply a data voltage to the plurality of pixels through a plurality of data lines, according to the VRR signal and the video data signal. The plurality of pixels can be driven at a first refresh rate or a second refresh rate which is lower than the first refresh rate, according to the VRR signal. Further, when the plurality of pixels are driven at the second refresh rate and the video data signal is a low grayscale video data signal, the output luminance of each of the plurality of pixels can be reduced during the blank period.

14 Claims, 7 Drawing Sheets

(51) Int. Cl.
*G09G 3/3208* (2016.01)
*G09G 3/3258* (2016.01)
*G09G 3/3291* (2016.01)

(52) U.S. Cl.
CPC ............... *G09G 2320/0233* (2013.01); *G09G 2320/0626* (2013.01); *G09G 2340/0435* (2013.01)

(56) References Cited

U.S. PATENT DOCUMENTS

| | | | | |
|---|---|---|---|---|
| 2012/0146999 | A1* | 6/2012 | Hwang | G09G 3/3233<br>345/204 |
| 2014/0267370 | A1* | 9/2014 | Albrecht | G09G 5/006<br>345/602 |
| 2015/0187276 | A1* | 7/2015 | Shim | G09G 3/3291<br>345/77 |
| 2016/0078846 | A1* | 3/2016 | Liu | G09G 5/18<br>345/212 |
| 2016/0124491 | A1* | 5/2016 | An | G06F 1/3265<br>713/323 |
| 2016/0358547 | A1* | 12/2016 | Zhu | G09G 3/3233 |
| 2017/0140713 | A1* | 5/2017 | Liu | G09G 3/36 |
| 2017/0140718 | A1* | 5/2017 | Liu | G09G 3/3648 |
| 2017/0169764 | A1* | 6/2017 | Lee | G09G 3/3266 |
| 2017/0337875 | A1* | 11/2017 | Jeon | H10K 59/1213 |
| 2018/0151109 | A1* | 5/2018 | Shim | G09G 3/32 |
| 2018/0158418 | A1* | 6/2018 | Ryu | H10K 59/131 |
| 2019/0164476 | A1* | 5/2019 | Feng | G09G 3/3225 |
| 2019/0172396 | A1* | 6/2019 | Yang | G09G 3/3233 |
| 2021/0035488 | A1* | 2/2021 | Seo | G09G 3/2092 |
| 2021/0074210 | A1* | 3/2021 | Yuan | G09G 3/3233 |
| 2022/0157243 | A1* | 5/2022 | Baek | G09G 3/3241 |
| 2022/0284860 | A1* | 9/2022 | Lin | G09G 3/3266 |

* cited by examiner

DISPLAY DEVICE

CROSS-REFERENCE TO RELATED APPLICATIONS

This application claims priority to Korean Patent Application No. 10-2021-0184212 filed on Dec. 21, 2021 in the Republic of Korea, the entire contents of which are hereby expressly incorporated by reference into the present application.

BACKGROUND OF THE DISCLOSURE

Field

The present disclosure relates to a display device, and more particularly, to a display device which is capable of varying a driving speed.

Description of the Related Art

As display devices which are used for a monitor of a computer, a television, or a cellular phone, there exist an organic light emitting display device (OLED) which is a self-emitting device and a liquid crystal display device (LCD) which requires a separate light source.

Among various display devices, an organic light emitting display device includes a display panel including a plurality of sub pixels and a driver which drives the display panel. The driver includes a gate driver configured to supply a gate signal to the display panel, and a data driver configured to supply a data voltage. When signals such as a gate signal and a data voltage are supplied to a sub pixel of the organic light emitting display device, the selected sub pixel emits light to display images.

The display device can vary a driving frequency according to an image to be implemented. For example, when a still image for which a high driving frequency is not necessary is implemented, the display device can be driven at a low driving frequency and when a fast moving image for which a high driving frequency is necessary is implemented, the display device can be driven at a high driving frequency.

When the display device implements a low grayscale image at a low frequency, a level of a data voltage is low so that a charging rate of a data voltage can be relatively reduced, which in turn may result in a reduction in the luminance of the display device.

SUMMARY OF THE DISCLOSURE

An object to be achieved by the present disclosure is to provide a display device which normally implements a low grayscale level during low frequency driving.

Another object to be achieved by the present disclosure is to provide a display device which implements a uniform low grayscale level at all frequencies.

Objects of the present disclosure are not limited to the above-mentioned objects, and other objects, which are not mentioned above, can be clearly understood by those skilled in the art from the following descriptions.

In order to achieve one or more of the above-described objects, according to an aspect of the present disclosure, a display device can include a display panel including a plurality of pixels configured to be driven in one of a driving period and a blank period, a timing controller configured to output a variable refresh rate (VRR) signal for determining a refresh rate of the plurality of pixels and a video data signal, and a data driver configured to supply a data voltage to the plurality of pixels through a plurality of data lines, according to the VRR signal and the video data signal, wherein the plurality of pixels are driven at a first refresh rate or a second refresh rate which is lower than the first refresh rate, according to the VRR signal, and when the plurality of pixels are driven at the second refresh rate and the video data signal is a low grayscale video data signal, the output luminance of each of the plurality of pixels is reduced during the blank period.

Other matters of the exemplary embodiments are included in the detailed description and the drawings.

According to one or more embodiments of the present disclosure, even though a refresh rate varies, a phenomenon of a luminance floatation of a low grayscale image can be suppressed.

According to one or more embodiments of the present disclosure, a driving current of a light emitting diode can be more quickly compensated.

According to one or more embodiments of the present disclosure, a configuration of a data driver can be more simplified.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENTS

Figure 1:
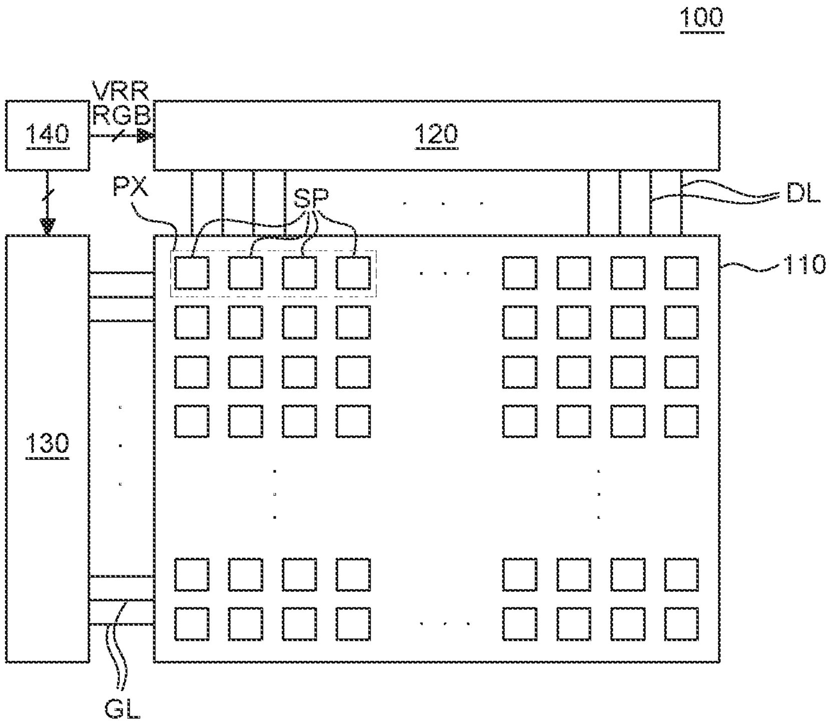
FIG. 1 is a schematic view of a display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted or may be provided briefly to avoid unnecessarily obscuring the subject matter of the present disclosure. The terms such as "including," "having," and "consist of" used herein are generally intended to allow other components to be added unless the terms are used with the term "only". Any references to singular can include plural unless expressly stated otherwise.

Components are interpreted to include an ordinary error range even if not expressly stated.

When the position relation between two parts is described using the terms such as "on", "above", "below", and "next", one or more parts can be positioned between the two parts unless the terms are used with the term "immediately" or "directly".

When an element or layer is disposed "on" another element or layer, another layer or another element can be interposed directly on the other element or therebetween.

Although the terms "first", "second", and the like are used for describing various components, these components are not confined by these terms. These terms are merely used for distinguishing one component from the other components, and may not define order. Therefore, a first component to be mentioned below can be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

A transistor used in a display device of the present disclosure can be implemented by one or more transistors among n-channel transistors (NMOS) and p-channel transistors (PMOS). The transistor can be implemented by an oxide semiconductor transistor having an oxide semiconductor as an active layer or an LTPS transistor having a low temperature poly-silicon (LTPS) as an active layer. The transistor can include at least a gate electrode, a source electrode, and a drain electrode. The transistor can be implemented as a thin film transistor on a display panel. In the transistor, carriers flow from the source electrode to the drain electrode. In the case of the n-channel transistor (NMOS), since the carriers are electrons, in order to allow the electrons to flow from the source electrode to the drain electrode, a source voltage can be lower than a drain voltage. The current in the n-channel transistor NMOS flows from the drain electrode to the source electrode and the source electrode can serve as an output terminal. In the case of the p-channel transistor (PMOS), since the carriers are holes, in order to allow the holes to flow from the source electrode to the drain electrode, a source voltage is higher than a drain voltage. In the p-channel transistor PMOS, the holes flow from the source electrode to the drain electrode so that current flows from the source to the drain and the drain electrode serves as an output terminal. Accordingly, the source and the drain can be changed in accordance with the applied voltage so that it should be noted that the source and the drain of the transistor are not fixed. In the present specification, it is assumed that the transistor is an n-channel transistor (NMOS), but is not limited thereto so that the p-channel transistor can be used and thus a circuit configuration can be changed.

A gate signal of transistors which are used as switching elements swings between a turn-on voltage and a turn-off voltage. The turn-on voltage is set to be higher than a threshold voltage Vth of the transistor and the turn-off voltage is set to be lower than the threshold voltage Vth of the transistor. The transistor is turned on in response to the turn-on voltage and is turned off in response to the turn-off voltage. In the case of the NMOS, the turn-on voltage is a high voltage and the turn-off voltage is a low voltage. In the case of the PMOS, the turn-on voltage can be a low voltage and the turn-off voltage can be a high voltage.

Hereinafter, various exemplary embodiments of the present disclosure will be described in detail with reference to accompanying drawings. All the components of each display device according to all embodiments of the present disclosure are operatively coupled and configured.

FIG. 1 is a schematic view of a display device according to an exemplary embodiment of the present disclosure.

Referring to FIG. 1, a display device 100 includes a display panel 110, a data driver 120, a gate driver 130, and a timing controller 140.

The display panel 110 is a panel for displaying images. The display panel 110 can include various circuits, wiring lines, and light emitting diodes disposed on the substrate. The display panel 110 is divided by a plurality of data lines DL and a plurality of gate lines GL intersecting each other and includes a plurality of pixels PX connected to the plurality of data lines DL and the plurality of gate lines GL. The display panel 110 includes a display area defined by a plurality of pixels PX and a non-display area in which various signal lines or pads are formed. The display panel 110 can be implemented by a display panel 110 used in various display devices such as a liquid crystal display device, an organic light emitting display device, or an electrophoretic display device. Hereinafter, it is described that the display panel 110 is a panel used in the organic light emitting display device, but is not limited thereto.

The timing controller 140 receives timing signals such as a vertical synchronization signal, a horizontal synchronization signal, a data enable signal, or a dot clock by using a receiving circuit such as an LVDS or TMDS interface connected to a host system. The timing controller 140 generates a data control signal to control the data driver 120 and gate control signals to control the gate driver 130, based on the input timing signal.

The timing controller 140 processes image data RGB input from the outside suitable for a size and a resolution of the display panel 110 to convert the image data into a video data signal RGB and then supply the converted video data signal to the data driver 120.

The timing controller 140 generates a variable refresh rate (VRR) signal VRR which allows the plurality of pixels PX to be driven at various refresh rates. For example, the timing controller generates VRR signals VRR associated with the driving to drive the plurality of pixels PX at variable refresh rates or to be switched between a first refresh rate and a second refresh rate. Specifically, the timing controller 140 generates clock signals having different frequencies or generates a synchronization signal to generate blanks with different duties to supply the signals to the data driver 120. In other words, the timing controller 140 generates a VRR signal VRR including clock signals having different frequencies and synchronization signals which generate blanks with different duties.

The data driver 120 supplies a data voltage to the plurality of sub pixels SP. The data driver 120 includes a plurality of source drive ICs (integrated circuits). The plurality of source drive ICs can be supplied with video data signals RGB and a data control signal from the timing controller 140. The data driver 120 converts video data signals RGB into a gamma voltage in response to the source timing control signal to generate a data voltage and supplies the data voltage through the data line DL of the display panel 110. The plurality of source drive ICs can be connected to the data line DL of the display panel 110 by a chip on glass (COG) process or a tape automated bonding (TAB) process. Further, the source drive ICs are formed on the display panel 110 or are formed on a separate PCB substrate to be connected to the display panel 110.

The data driver 120 controls a timing at which the data voltage is output, in accordance with the VRR signal VRR. For example, the data driver 120 outputs a data voltage corresponding to a level for sensing or a level for compensation during a blank period which varies according to the VRR signal VRR and outputs a data voltage according to the video data signal RGB during a driving period excluding the blank period.

The gate driver 130 supplies a gate signal to the plurality of sub pixels SP. The gate driver 130 can include a level shifter and a shift register. The level shifter shifts a level of a clock signal input at a transistor-transistor-logic (TTL) level from the timing controller 140 and then supplies the clock signal to the shift register. The shift register can be formed in the non-display area of the display panel 110, by a GIP manner, but is not limited thereto. The shift register is configured by a plurality of stages which shifts the gate signal to output, in response to the clock signal and the driving signal. The plurality of stages included in the shift register sequentially output the gate signal through a plurality of output terminals.

The display panel 110 can include a plurality of sub pixels SP. The plurality of sub pixels SP can be sub pixels SP for emitting different color light. For example, the plurality of sub pixels SP can be a red sub pixel, a green sub pixel, a blue sub pixel, and a white sub pixel, but is not limited thereto. The plurality of sub pixels SP can configure a pixel PX. For example, the red sub pixel, the green sub pixel, the blue sub pixel, and the white sub pixel can constitute one pixel PX and the display panel 110 can include a plurality of such pixels PX.

Hereinafter, a driving circuit for driving one sub pixel SP will be described in more detail with reference to FIG. 2 together.

Figure 2:
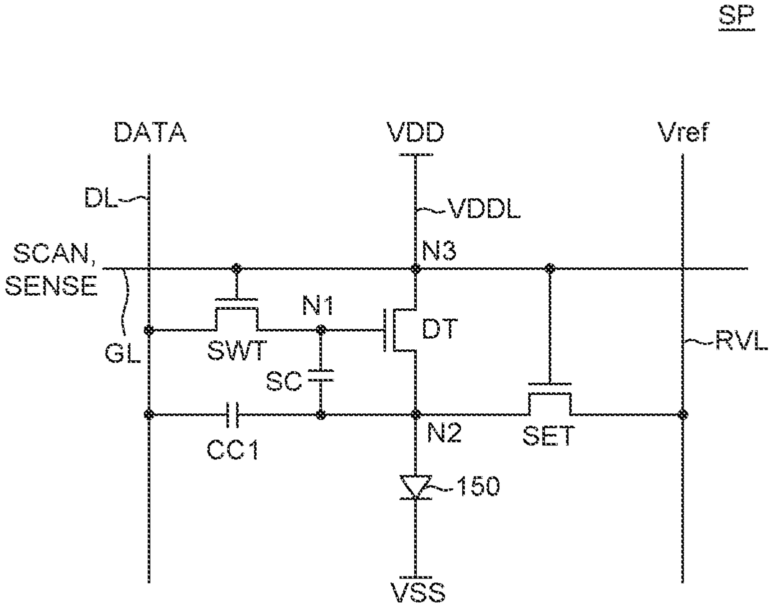
FIG. 2 is a circuit diagram of a sub pixel of a display device according to an exemplary embodiment of the present disclosure.

FIG. 2 is a circuit diagram of a sub pixel of a display device according to an exemplary embodiment of the present disclosure.

In FIG. 2, a circuit diagram for one sub pixel SP among the plurality of sub pixels SP of the display device 100 is illustrated as an example. Each sub pixel SP of FIG. 1 can have the configuration of the sub pixel SP of FIG. 2.

Referring to FIG. 2, the sub pixel SP can include a switching transistor SWT, a sensing transistor SET, a driving transistor DT, a storage capacitor SC, a first compensation capacitor CC1, and a light emitting diode 150.

The light emitting diode 150 can include an anode, an organic layer, and a cathode. The organic layer can include various organic layers such as a hole injection layer, a hole transport layer, an organic light emitting layer, an electron transport layer, and an electron injection layer. The anode of the light emitting diode 150 can be connected to an output terminal of the driving transistor DT and a low potential voltage VSS is applied to the cathode. Even though in FIG. 2, it is described that the light emitting diode 150 is an organic light emitting diode 150, the present disclosure is not limited thereto so that as the light emitting diode 150, an inorganic light emitting diode, for example, an LED can also be used.

Referring to FIG. 2, the switching transistor SWT is a transistor which transmits the data voltage DATA to a first node N1 corresponding to a gate electrode of the driving transistor DT. The switching transistor SWT can include a drain electrode connected to the data line DL, a gate electrode connected to the gate line GL, and a source electrode connected to the gate electrode of the driving transistor DT. The switching transistor SWT is turned on by a scan signal SCAN applied from the gate line GL to transmit a data voltage DATA supplied from the data line DL to the first node N1 corresponding to the gate electrode of the driving transistor DT.

Referring to FIG. 2, the driving transistor DT is a transistor configured to supply a driving current to the light emitting diode 150 to drive the light emitting diode 150. The driving transistor DT can include a gate electrode corresponding to the first node N1, a source electrode corresponding to a second node N2 and an output terminal, and a drain electrode corresponding to a third node N3 and an input terminal. The gate electrode of the driving transistor DT is connected to the switching transistor SWT, the drain electrode is applied with a high potential voltage VDD by a high potential voltage line VDDL, and the source electrode is connected to the anode of the light emitting diode 150.

Referring to FIG. 2, a storage capacitor SC is a capacitor which maintains a voltage corresponding to the data voltage DATA for one frame. One electrode of the storage capacitor SC is connected to the first node N1 and the other electrode is connected to the second node N2.

In the meantime, in the case of the display device 100, as the driving time of each sub pixel SP is increased, the circuit element such as the driving transistor DT can be degraded. Accordingly, a unique characteristic value of the circuit element such as a driving transistor DT can be changed. Here, the unique characteristic value of the circuit element can include a threshold voltage Vth of the driving transistor DT or a mobility a of the driving transistor DT. The change in the characteristic value of the circuit element can cause a luminance change of the corresponding sub pixel SP. Accordingly, the change in the characteristic value of the circuit element can be used as the same concept as the luminance change of the sub pixel SP.

Further, the degree of the change in the characteristic values between circuit elements of each sub pixel SP can vary depending on a degree of degradation of each circuit element. Such a difference in the changed degree of the characteristic values between the circuit elements can cause a luminance deviation between the sub pixels SP. Accordingly, the characteristic value deviation between circuit elements can be used as the same concept as the luminance deviation between the sub pixels SP. The change in the characteristic values of the circuit elements, for example, the luminance change of the sub pixel SP and the characteristic value deviation between the circuit elements, for example, the luminance deviation between the sub pixels SP can cause problems such as the lowering of the accuracy for luminance expressiveness of the sub pixel SP or screen abnormality.

Therefore, the sub pixel SP of the display device 100 according to the exemplary embodiment of the present disclosure provides a sensing function of sensing a characteristic value for the sub pixel SP and a compensating function of compensating for the characteristic value of the sub pixel SP using the sensing result.

Therefore, as illustrated in FIG. 2, the sub pixel SP can further include a sensing transistor SET to effectively control a voltage state of the source electrode of the driving transistor DT, in addition to the switching transistor SWT, the driving transistor DT, the storage capacitor SC, and the light emitting diode 150.

Referring to FIG. 2, the sensing transistor SET is connected between the source electrode of the driving transistor DT and the reference voltage line RVL configured to supply a reference voltage Vref and a gate electrode is connected to the gate line GL. Therefore, the sensing transistor SET is turned on by the sensing signal SENSE applied through the gate line GL to apply the reference voltage Vref which is supplied through the reference voltage line RVL to the source electrode of the driving transistor DT. Further, the sensing transistor SET can be utilized as one of voltage sensing paths for the source electrode of the driving transistor DT.

Referring to FIG. 2, the switching transistor SWT and the sensing transistor SET of the sub pixel SP can share one gate line GL. For example, the switching transistor SWT and the sensing transistor SET are connected to the same gate line GL to be applied with the same gate signal. However, for the convenience of description, a voltage which is applied to the gate electrode of the switching transistor SWT is referred to as a scan signal SCAN and a voltage which is applied to the gate electrode of the sensing transistor SET is referred to as a sensing signal SENSE. However, the scan signal SCAN and the sensing signal SENSE applied to one sub pixel SP are the same signal which is transmitted from the same gate line GL.

However, the present disclosure is not limited thereto so that only the switching transistor SWT is connected to the gate line GL and the sensing transistor SET can be connected to a separate sensing line. Therefore, the scan signal SCAN is applied to the switching transistor SWT through the gate line GL and the sensing signal SENSE is applied to the sensing transistor SET through the sensing line.

Accordingly, the reference voltage Vref is applied to the source electrode of the driving transistor DT by the sensing transistor SET. Further, a voltage for sensing the threshold voltage Vth of the driving transistor DT or the mobility a of the driving transistor DT is detected by the reference voltage line RVL. Further, the data driver 120 can compensate for the data voltage DATA in accordance with a variation of the threshold voltage Vth of the driving transistor DT or the mobility a of the driving transistor DT.

Further, in the display device according to the exemplary embodiment of the present disclosure, each of the plurality of sub pixels SP further includes a first compensation capacitor CC1 for compensating for an output luminance of the light emitting diode 150.

The first compensation capacitor CC1 controls a voltage applied to the anode of the light emitting diode 150 to compensate for an output luminance of the light emitting diode 150. One electrode of the first compensation capacitor CC1 is connected to a second node N2 which is the anode of the light emitting diode 150 and the other electrode is connected to the data line DL. Therefore, a voltage of the anode of the light emitting diode 150 can vary according to the change of the data voltage DATA applied to the data line DL.

Hereinafter, the driving of the display device according to the exemplary embodiment of the present disclosure will be described with reference to FIGS. 3 and 4 together.

Figure 3:
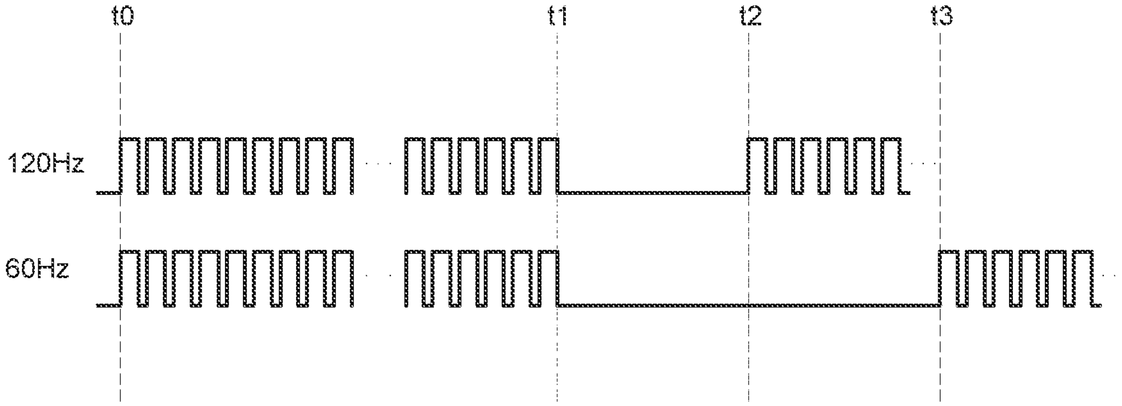
FIG. 3 is a waveform diagram of a clock signal for explaining variable refresh rate (VRR) driving of a display device according to one exemplary embodiment of the present disclosure.

FIG. 3 shows a waveform diagram of a clock signal for explaining VRR driving of a display device according to one exemplary embodiment of the present disclosure.

In FIG. 3, a clock signal when a display device according to the exemplary embodiment of the present disclosure is driven at 120 Hz which is a first refresh rate and a clock signal when the display device is driven at 60 Hz which is a second refresh rate lower than the first refresh rate are illustrated.

When the display device is driven at 120 Hz which is the first refresh rate according to the VRR signal VRR, the clock signal is activated during the driving period (t0-t1). Therefore, a data voltage DATA corresponding to the video data signal RGB is applied to the plurality of pixels PX during the driving period (t0-t1) so that the plurality of pixels PX are driven. During the blank period (t1-t2), the clock signal is inactivated. Therefore, during the blank period (t1-t2), the data voltage DATA corresponding to the video data signal RGB is not applied to the plurality of pixels PX, a threshold voltage Vth of the driving transistor DT or a mobility a of the driving transistor DT is sensed by the sensing transistor SET. For example, when the plurality of pixels PX are driven at 120 Hz which is a first refresh rate, the blank period (t1-t2) can include only a sensing period. The clock signal is activated again after the blank period (t1-t2) so that the driving period is repeated.

When the plurality of pixels PX are driven at 60 Hz which is the second refresh rate according to the VRR signal VRR, the clock signal is activated during the driving period (t0-t1). Therefore, a data voltage DATA corresponding to the video data signal RGB is applied to the plurality of pixels PX during the driving period (t0-t1) so that the plurality of pixels PX are driven. Further, the clock signal is inactivated during the blank period (t1-t3) so that a data voltage DATA corresponding to the video data signal RGB is not applied to the plurality of pixels PX.

When the video data signal RGB output during the above-described driving period (t0-t1) is a low grayscale video data signal, during a partial period (t1-t2) of the blank period (t1-t3), the threshold voltage Vth of the driving transistor DT or the mobility a of the driving transistor DT is sensed by the sensing transistor SET. The partial period (t1-t2) of the blank period (t1-t3) described above can be a sensing period. During the other subsequent period t2-t3 of the blank period (t1-t3), the voltage applied to the anode of the light emitting diode 150 is controlled by the first compensation capacitor CC1 to compensate for an output luminance of the light emitting diode 150. The other period (t2-t3) of the blank period (t1-t3) can be a compensation period. For example, when the plurality of pixels PX implement a low gray scale at the second refresh rate, the blank period (t1-t3) includes not only the sensing period (t1-t2), but also the compensation period (t2-t3).

When the video data signal RGB output during the above-described driving period (t0-t1) is a high grayscale video data signal, during the blank period (t1-t3), the threshold voltage Vth of the driving transistor DT or the mobility a of the driving transistor DT is sensed by the sensing transistor SET. For example, when the plurality of pixels implements a high gray scale at the second refresh rate, the blank period (t1-t3) includes only the sensing period.

The clock signal is activated again after the blank period (t1-t3) so that the driving period is repeated.

Hereinafter, the luminance compensation of the light emitting diode 150 during the compensation period (t2-t3) when the plurality of pixels PX implement a low gray scale at a second refresh rate will be described with reference to FIG. 4.

Figure 4:
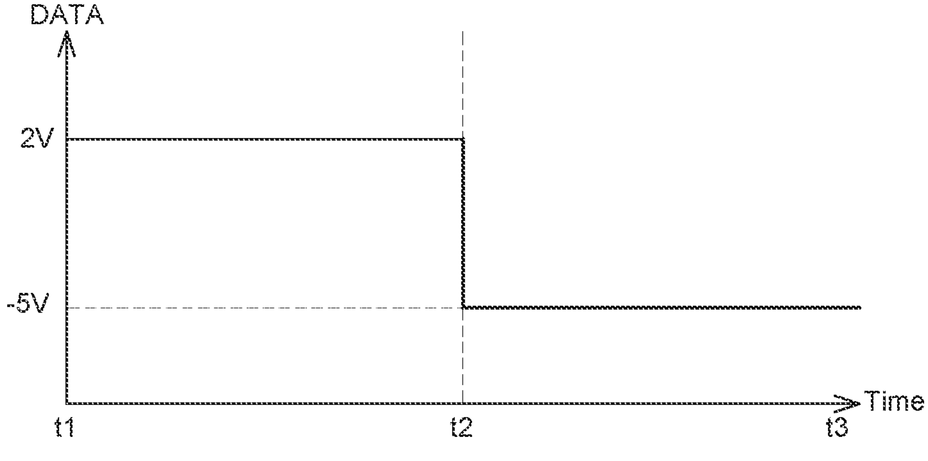
FIG. 4 is a view for explaining a sensing method of a display device according to an exemplary embodiment of the present disclosure.

FIG. 4 is a view for explaining a sensing method of a display device according to an exemplary embodiment of the present disclosure.

Referring to FIG. 4, when the plurality of pixels PX implement a low gray scale at a second refresh rate, the data voltage DATA during the compensation period (t2-t3) can be lower than the data voltage DATA during the sensing period (t1-t2).

For example, during the sensing period (t1-t2), a data voltage DATA which implements a lowest gray scale is applied to sense the threshold voltage Vth of the driving transistor DT or the mobility a of the driving transistor DT. For example, a data voltage DATA of 2 V can be applied to allow the plurality of pixels PX to implement black.

During the compensation period (t2-t3), the data voltage DATA can drop to compensate for the luminance of the light emitting diode 150. For example, a data voltage DATA of −5 V can be applied to reduce the luminance of the plurality of pixels PX.

For example, the data voltage DATA is reduced during the compensation period (t2-t3) so that a voltage of the anode of the light emitting diode 150 which couples with the data line DL via the first compensation capacitor CC1 is also lowered. Therefore, a voltage level applied between the anode and the cathode of the light emitting diode 150 is reduced so that the driving current of the light emitting diode 150 is reduced. As a result, when the plurality of pixels PX are driven at the second refresh rate and the video data signal RGB is a low grayscale video data signal, the driving current of the light emitting diode 150 is reduced to compensate for the output luminance of the light emitting diode 150 to be reduced.

Figure 5A:
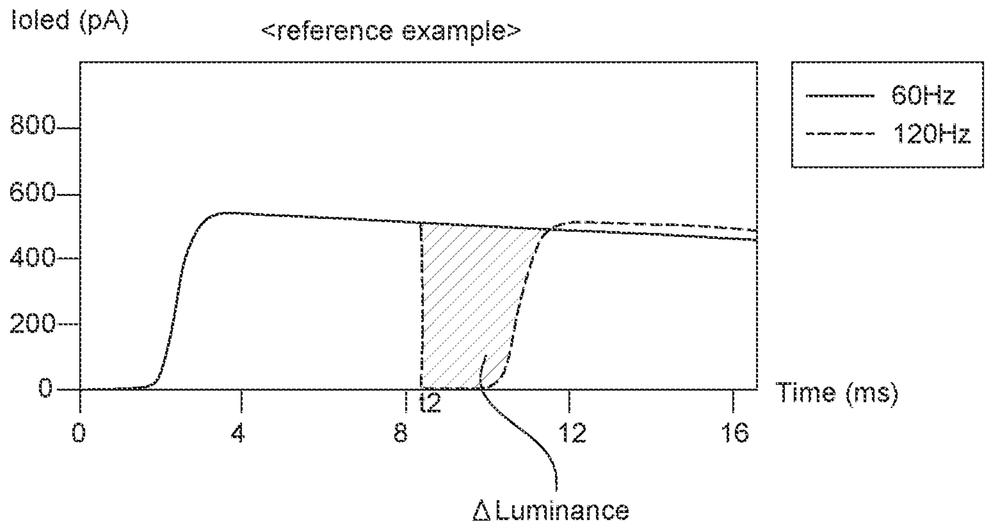
FIG. 5A is a waveform diagram of a driving current according to VRR driving of a display device of a related art.

FIG. 5A is a waveform diagram of a driving current according to VRR driving of a display device of a related art.

Figure 5B:
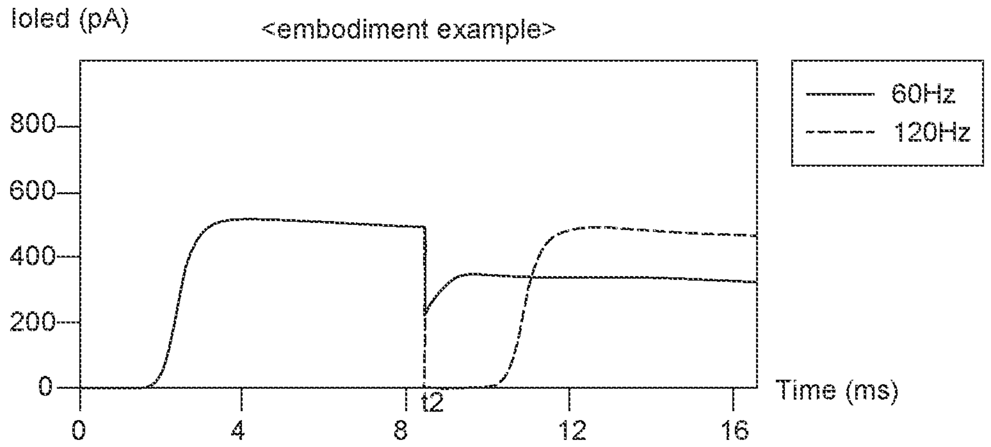
FIG. 5B is a waveform diagram of a driving current according to VRR driving of a display device according to an exemplary embodiment of the present disclosure.

FIG. 5B is a waveform diagram of a driving current according to VRR driving of a display device according to an exemplary embodiment of the present disclosure.

FIGS. 5A and 5B are waveform diagrams illustrating a driving current Ioled of the light emitting diode 150 at a first refresh rate of 120 Hz and a second refresh rate of 60 Hz when the plurality of pixels PX implement a low gray scale.

Referring to FIG. 5, when the display device of the related art is driven at the first refresh rate of 120 Hz, the display device is refreshed at a timing t2 so that the data voltage DATA is recharged at a low speed. Therefore, an average value of the driving current Ioled of the light emitting diode 150 is reduced to be approximately 327 pA.

In contrast, when the display device of the related art is driven at the second refresh rate of 60 Hz, the display device is not refreshed at a timing t2 so that the charged data voltage is maintained as it is. Therefore, an average value of the driving current Ioled of the light emitting diode 150 is not reduced to be approximately 376 pA.

For example, when the display device of the related art implements a low gray scale, a difference of driving current Ioled of 15.1% is caused due to the low recharging speed of the data voltage DATA at the first refresh rate. Accordingly, even though the same low gray scale is implemented in the display device of the related art, there can be a limitation in that the output luminance can be relatively brighter during the second refresh rate driving than during the first refresh rate driving.

Therefore, the display device according to the exemplary embodiment of the present disclosure reduces the output luminance of the plurality of pixels during the compensation period when the display device is driven at the second refresh rate to compensate for the above-described output luminance difference.

Referring to FIG. 5B, when the display device according to the exemplary embodiment of the present disclosure is driven at the first refresh rate of 120 Hz, the display device is refreshed at a timing t2 so that the data voltage DATA is recharged at a low speed. Therefore, an average value of the driving current Ioled of the light emitting diode 150 is reduced to be approximately 327 pA.

In contrast, when the display device according to the exemplary embodiment of the present disclosure is driven at the second refresh rate of 60 Hz, the data voltage DATA is reduced at a timing t2, so that the voltage of the anode of the coupled light emitting diode 150 is also reduced. Therefore, an average value of the driving current Ioled of the light emitting diode 150 is also reduced to be approximately 329 pA.

For example, when the display device according to the exemplary embodiment of the present disclosure implements a low gray scale, the output luminance at the second refresh rate is reduced as much as the reduced amount of the output luminance at the first refresh rate. Accordingly, when the display device according to the exemplary embodiment of the present disclosure implements the same low gray scale, a difference of the driving current Ioled is only 0.6%.

Therefore, in the display device according to the exemplary embodiment of the present disclosure, when the same low grayscale is implemented, all output luminances are maintained to be a similar level both in the case of being driven at the first refresh rate and the case of being driven at the second refresh rate. As a result, in the display device according to the exemplary embodiment of the present disclosure, even though the refresh rate varies, the low grayscale image can be smoothly implemented.

In the display device of the related art, in order to reduce the above-mentioned luminance difference during the low grayscale implementation, different gamma voltages are set for the first refresh rate and the second refresh rate to output the data voltage.

In this case, a memory for storing various gamma voltages is necessary and a tact time for applying the changed gamma voltage is needed.

However, the display device according to the exemplary embodiment of the present disclosure simply changes the data voltage to compensate for the output luminance. By doing this, the display device according to the exemplary embodiment of the present disclosure does not need a memory for storing various gamma voltages so that a simpler data driver can be implemented.

Further, the display device according to the exemplary embodiment of the present disclosure does not need the tact time to apply the changed gamma voltage so that the output luminance difference can be more quickly compensated.

Hereinafter, a display device according to another exemplary embodiment of the present disclosure will be described.

The only difference between the display device according to another exemplary embodiment of the present disclosure and the display device according to the exemplary embodiment of the present disclosure is the first compensation transistor so that this will be mainly described. The waveform diagram of FIG. 3 is applied to the other exemplary embodiment of the present disclosure in the same way to be referenced.

Figure 6:
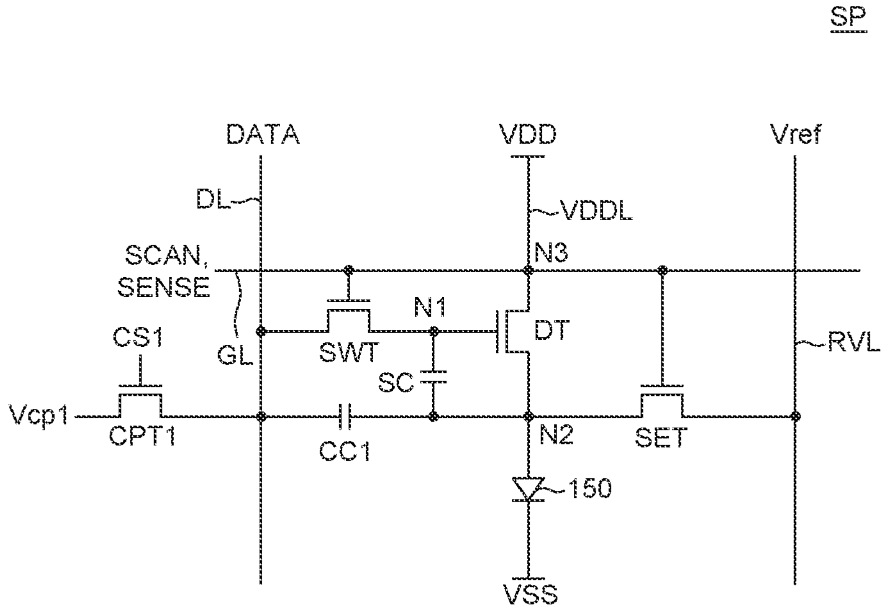
FIG. 6 is a circuit diagram of a sub pixel of a display device according to another exemplary embodiment (second exemplary embodiment) of the present disclosure.

FIG. 6 is a circuit diagram of a sub pixel of a display device according to another exemplary embodiment of the present disclosure.

Referring to FIG. 6, the sub pixel SP of the display device according to another exemplary embodiment (second embodiment) of the present disclosure can include a switching transistor SWT, a sensing transistor SET, a driving transistor DT, a storage capacitor SC, a first compensation capacitor CC1, and a light emitting diode 150. The sub pixel SP can further include a first compensation transistor CPT1.

The first compensation transistor CPT1 applies a first compensation voltage Vcp1 to the first compensation capacitor CC1 to compensate for the luminance of the light emitting diode 150 in a compensation period (t2-t3).

The first compensation transistor CPT1 includes a gate electrode applied with a first compensation signal CS1, a source electrode applied with a first compensation voltage Vcp1, and a drain electrode connected to the plurality of first compensation capacitors CC1. In other words, the first compensation capacitor CC1 is connected to the data line DL so that the first compensation transistor CPT1 is also connected to the data line DL.

When the plurality of pixels PX implement a low gray scale at the second refresh rate, the first compensation signal CS1 can be at a turn-on level only during the compensation period (t2-t3). Therefore, when the plurality of pixels PX implement the low gray scale at the second refresh rate, the first compensation transistor CPT1 is turned on only during the compensation period (t2-t3) to apply the first compensation voltage Vcp1 to the first compensation transistor CPT1.

The first compensation voltage Vcp1 is lower than the lowest level of the data voltage DATA.

Specifically, during the sensing period (t1-t2), a data voltage DATA for implementing the lowest gray scale can be applied. For example, a data voltage DATA of 2 V can be applied to allow the plurality of pixels PX to implement black.

The first compensation voltage Vcp1 is lower than the data voltage DATA for implementing the lowest gray scale. For example, in order to reduce the luminance of the plurality of pixels PX, the first compensation voltage Vcp1 can be −5 V.

For example, during the compensation period (t2-t3), the first compensation voltage Vcp1 is applied so that the voltage of the anode of the light emitting diode 150 can be lowered by the first compensation capacitor CC1. Therefore, a voltage level applied between the anode and the cathode of the light emitting diode 150 is reduced so that the driving current of the light emitting diode 150 is reduced. As a result, when the plurality of pixels PX are driven at the second refresh rate and the video data signal RGB is a low grayscale video data signal, the driving current of the light emitting diode 150 is reduced to compensate for the output luminance of the light emitting diode 150 to be reduced.

Therefore, in the display device according to another exemplary embodiment of the present disclosure, when the same low gray scale is implemented, all output luminances are maintained at a similar level both in the case of being driven at the first refresh rate and the case of being driven at the second refresh rate. As a result, in the display device according to another exemplary embodiment of the present disclosure, even though the refresh rate varies, the low grayscale image can be smoothly implemented.

Hereinafter, a display device according to still another exemplary embodiment (third exemplary embodiment) of the present disclosure will be described.

The only difference between the display device according to still another exemplary embodiment (third exemplary embodiment) of the present disclosure and the display device according to the exemplary embodiment of the present disclosure is the second compensation transistor so that this will be mainly described. The waveform diagram of FIG. 3 is applied to the other exemplary embodiment of the present disclosure in the same way to be referenced.

Figure 7:
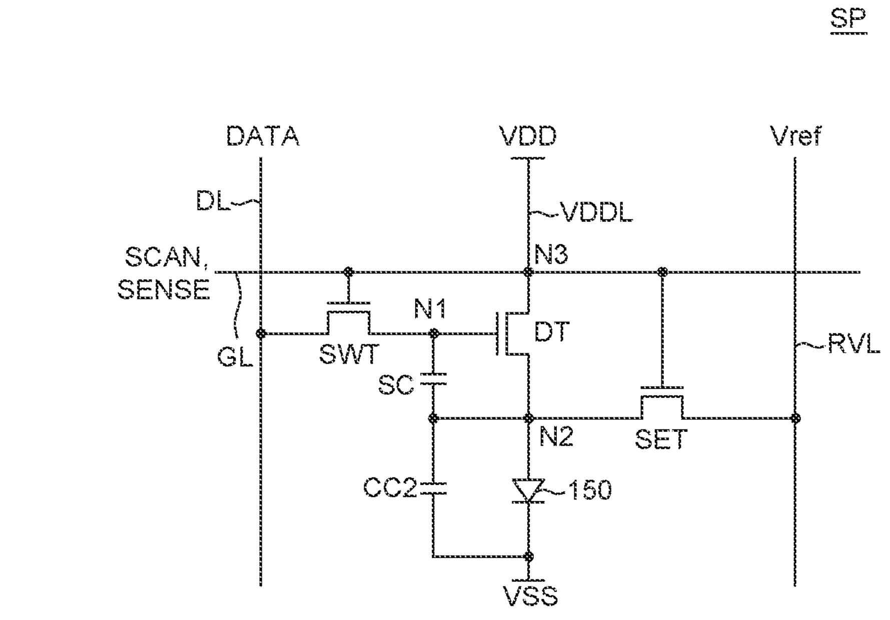
FIG. 7 is a circuit diagram of a sub pixel of a display device according to still another exemplary embodiment (third exemplary embodiment) of the present disclosure.

FIG. 7 is a circuit diagram of a sub pixel of a display device according to still another exemplary embodiment (third exemplary embodiment) of the present disclosure.

In FIG. 7, a circuit diagram for one sub pixel SP among the plurality of sub pixels SP of the display device 100 is illustrated.

Referring to FIG. 7, the sub pixel SP can include a switching transistor SWT, a sensing transistor SET, a driving transistor DT, a storage capacitor SC, a second compensation capacitor CC2, and a light emitting diode 150.

Further, in the display device according to still another exemplary embodiment (third exemplary embodiment) of the present disclosure, each of the plurality of sub pixels SP further includes a second compensation capacitor CC2 for compensating for an output luminance of the light emitting diode 150.

The second compensation capacitor CC2 controls a voltage applied to the anode of the light emitting diode 150 to compensate for an output luminance of the light emitting diode 150. One electrode of the second compensation capacitor CC2 is connected to a second node N2 which is the anode of the light emitting diode 150 and the other electrode is connected to the cathode of the light emitting diode 150. Therefore, a voltage of the anode of the light emitting diode 150 can vary in accordance with the change of a low potential voltage VSS applied to the cathode of the light emitting diode 150. Therefore, the driving current of the light emitting diode 150 is also changed.

Hereinafter, the driving of the display device according to still another exemplary embodiment (third exemplary embodiment) of the present disclosure will be described with reference to FIGS. 3 and 8 together.

In FIG. 3, a clock signal when a display device according to still another exemplary embodiment of the present disclosure is driven at 120 Hz which is a first refresh rate and a clock signal when the display device is driven at 60 Hz which is a second refresh rate lower than the first refresh rate are illustrated.

When the display device is driven at 120 Hz which is the first refresh rate according to the VRR signal VRR, the clock signal is activated during the driving period (t0-t1). Therefore, a data voltage DATA corresponding to the video data signal RGB is applied to the plurality of pixels PX during the driving period (t0-t1) so that the plurality of pixels PX are driven. During the blank period (t1-t2), the clock signal is inactivated. Therefore, during the blank period (t1-t2), the data voltage DATA corresponding to the video data signal RGB is not applied to the plurality of pixels PX, a threshold voltage Vth of the driving transistor DT or a mobility α of the driving transistor DT is sensed by the sensing transistor SET. For example, when the plurality of pixels PX are driven at 120 Hz which is a first refresh rate, the blank period (t1-t2) can include only a sensing period. The clock signal is activated after the blank period (t1-t2) so that the driving period is repeated.

When the plurality of pixels PX are driven at 60 Hz which is the second refresh rate according to the VRR signal VRR, the clock signal is activated during the driving period (t0-t1). Therefore, a data voltage DATA corresponding to the video data signal RGB is applied to the plurality of pixels PX during the driving period (t0-t1) so that the plurality of pixels PX are driven. Further, the clock signal is inactivated during the blank period (t1-t3) so that a data voltage DATA corresponding to the video data signal RGB is not applied to the plurality of pixels PX.

When the video data signal RGB output during the above-described driving period (t0-t1) is a low grayscale video data signal, during a partial period (t1-t2) of the blank period (t1-t3), the threshold voltage Vth of the driving transistor DT or the mobility a of the driving transistor DT is sensed by the sensing transistor SET. The above-described partial period (t1-t2) of the blank period (t1-t3) can be a sensing period. During the other subsequent period t2-t3 of the blank period (t1-t3), the voltage applied to the anode of the light emitting diode 150 is controlled by the second compensation capacitor CC2 to compensate for an output luminance of the light emitting diode 150. The subsequent period (t2-t3) of the blank period (t1-t3) can be a compensation period. For example, when the plurality of pixels PX implement a low gray scale at the second refresh rate, the blank period (t1-t3) includes not only the sensing period (t1-t2), but also the compensation period (t2-t3).

When the video data signal RGB output during the above-described driving period (t0-t1) is a high grayscale video data signal, during the blank period (t1-t3), the threshold voltage Vth of the driving transistor DT or the mobility a of the driving transistor DT is sensed by the sensing transistor SET. For example, when the plurality of pixels implements a high gray scale level at the second refresh rate, the blank period (t1-t3) includes only the sensing period.

The clock signal is activated again after the blank period (t1-t3) so that the driving period is repeated.

Hereinafter, the luminance compensation of the light emitting diode 150 during the compensation period (t2-t3) when the plurality of pixels PX implement a low gray scale at a second refresh rate will be described with reference to FIG. 8.

Figure 8:
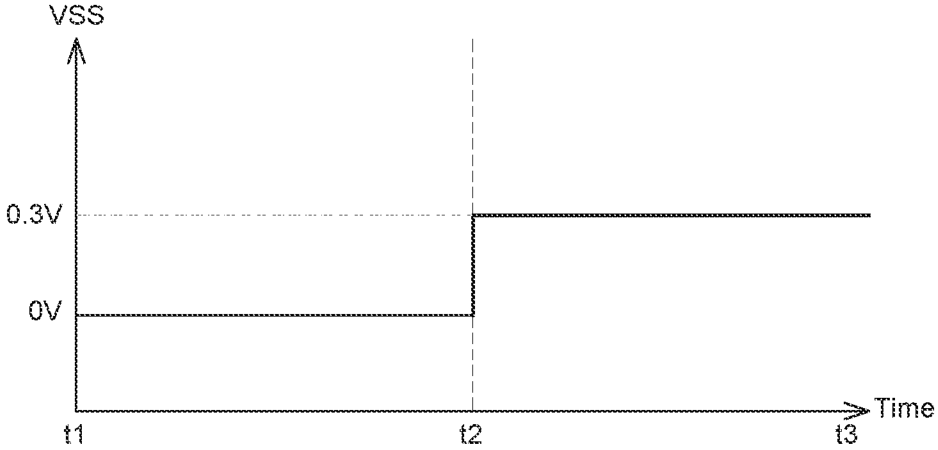
FIG. 8 is a waveform diagram of a data voltage of a display device according to still another exemplary embodiment (third exemplary embodiment) of the present disclosure.

FIG. 8 is a waveform diagram of a data voltage of a display device according to still another exemplary embodiment (third exemplary embodiment) of the present disclosure.

Referring to FIG. 8, when the plurality of pixels PX implement a low gray scale at a second refresh rate, the low potential voltage VSS during the compensation period (t2-t3) can be higher than the low potential voltage VSS during the sensing period (t1-t2).

For example, during the sensing period (t1-t2), a low potential voltage VSS of 0 V can be applied, similar to the driving period (t0-t1).

During the compensation period (t2-t3), the low potential voltage VSS can rise during the compensation period t2-t3 to compensate for the luminance of the light emitting diode 150. For example, a low potential voltage VSS of 0.3 V can be applied during the compensation period t2-t3 to reduce the luminance of the plurality of pixels PX.

For example, the low potential voltage VSS is increased during the compensation period (t2-t3), which increases a voltage of the anode of the light emitting diode 150 coupled to the cathode of the light emitting diode 150 via the second compensation capacitor CC2. However, the voltage of the anode of the light emitting diode 150 increases due to the coupling so that an increased amount of the low potential voltage VSS which is a voltage of the anode of the light emitting diode 150 is lower than an increased amount of the voltage of the cathode of the light emitting diode 150. Therefore, a voltage level applied between the anode and the cathode of the light emitting diode 150 is reduced so that the driving current of the light emitting diode 150 is reduced. As a result, when the plurality of pixels PX are driven at the second refresh rate and the video data signal RGB is a low grayscale video data signal, the driving current of the light emitting diode 150 is reduced to compensate for the output luminance of the light emitting diode 150 to be reduced.

Figure 9:
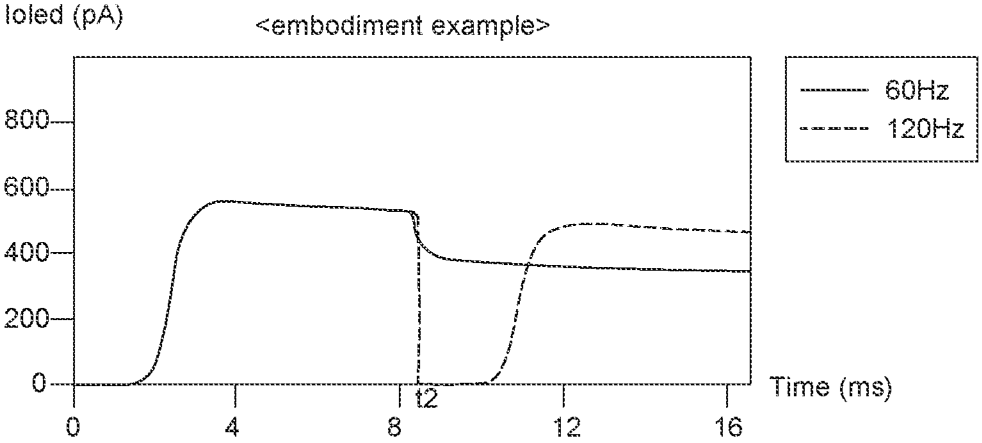
FIG. 9 is a waveform diagram of a driving current according to VRR driving of a display device according to still another exemplary embodiment (third exemplary embodiment) of the present disclosure.

FIG. 9 is a waveform diagram of a driving current according to VRR driving of a display device according to still another exemplary embodiment (third exemplary embodiment) of the present disclosure.

FIG. 9 is a waveform diagram illustrating a driving current Ioled of the light emitting diode 150 at a first refresh rate of 120 Hz and a second refresh rate of 60 Hz when the plurality of pixels PX implement a low gray scale.

The display device according to still another exemplary embodiment (a third exemplary embodiment) of the present disclosure reduces the output luminance of the plurality of pixels during the compensation period while being driven at the second refresh rate, to compensate for an output luminance difference described in FIG. 5A.

Referring to FIG. 9, when the display device according to still another exemplary embodiment (third exemplary embodiment) of the present disclosure is driven at the first refresh rate of 120 Hz, the display device is refreshed at a timing t2 so that the data voltage DATA is recharged at a low speed. Therefore, an average value of the driving current Ioled of the light emitting diode 150 is reduced to be approximately 327 pA.

When the display device according to still another exemplary embodiment (third exemplary embodiment) of the present disclosure is driven at the second refresh rate of 60 Hz, the low potential voltage VSS is increased at a timing t2, so that the voltage of the anode of the coupled light emitting diode 150 is also increased. However, the voltage of the anode of the light emitting diode 150 increases due to the coupling so that an increased amount of a voltage of the anode of the light emitting diode 150 is lower than an increased amount of the low potential voltage VSS which is a voltage of the cathode of the light emitting diode 150. Therefore, an average value of the driving current Ioled of the light emitting diode 150 is also reduced to be approximately 328 pA.

For example, when the display device according to still another exemplary embodiment (third exemplary embodiment) of the present disclosure implements a low gray scale, the output luminance at the second refresh rate is reduced as much as the reduced amount of the output luminance at the first refresh rate. Accordingly, when the display device according to still another exemplary embodiment (third exemplary embodiment) of the present disclosure implements the same low gray scale, a difference of the driving current Ioled is only 0.03%.

Therefore, in the display device according to still another exemplary embodiment (third exemplary embodiment) of the present disclosure, when the same low grayscale is implemented, all output luminances are maintained at a similar level both in the case of being driven at the first refresh rate and the case of being driven at the second refresh rate. As a result, in the display device according to still another exemplary embodiment (third exemplary embodiment) of the present disclosure, even though the refresh rate varies, the low grayscale image can be smoothly implemented.

Further, the display device according to still another exemplary embodiment (third exemplary embodiment) of the present disclosure does not require the tact time to apply the changed gamma voltage so that the output luminance difference can be more quickly compensated.

Hereinafter, a display device according to still another exemplary embodiment (fourth exemplary embodiment) of the present disclosure will be described.

The only difference between the display device according to still another exemplary embodiment (fourth exemplary embodiment) of the present disclosure and the display device according to still another exemplary embodiment (third exemplary embodiment) of the present disclosure can be the second compensation transistor so that this will be mainly described. The waveform diagram of FIG. 3 is applied to the other exemplary embodiment (fourth exemplary embodiment) of the present disclosure in the same way to be referenced.

Figure 10:
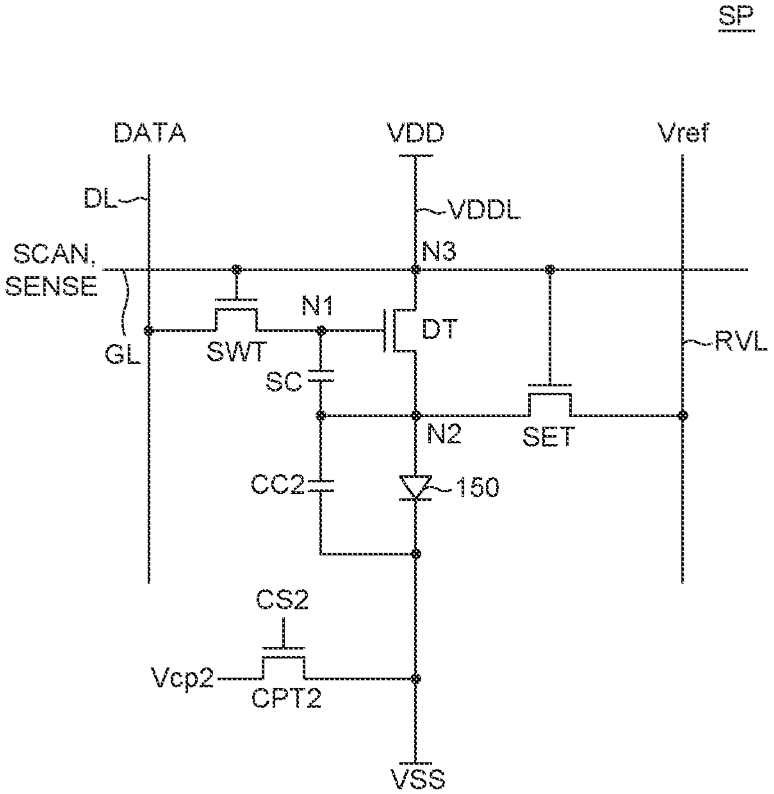
FIG. 10 is a circuit diagram of a sub pixel of a display device according to still another exemplary embodiment (fourth exemplary embodiment) of the present disclosure.

FIG. 10 is a circuit diagram of a sub pixel of a display device according to still another exemplary embodiment (fourth exemplary embodiment) of the present disclosure.

Referring to FIG. 10, the sub pixel SP of the display device according to still another exemplary embodiment (fourth exemplary embodiment) of the present disclosure can include a switching transistor SWT, a sensing transistor SET, a driving transistor DT, a storage capacitor SC, a second compensation capacitor CC2, and a light emitting diode 150. The sub pixel SP can further include a second compensation transistor CPT2.

The second compensation transistor CPT2 applies a second compensation voltage Vcp2 to the second compensation capacitor CC2 to compensate for the luminance of the light emitting diode 150 in a compensation period (t2-t3).

The second compensation transistor CPT2 includes a gate electrode applied with a second compensation signal CS2, a source electrode applied with a second compensation voltage Vcp2, and a drain electrode connected to the plurality of second compensation capacitors CC2. In other words, the second compensation capacitor CC2 is connected to the cathode of the light emitting diode 150 so that the second compensation transistor CPT2 is also connected to the cathode of the light emitting diode 150.

When the plurality of pixels PX implement a low grayscale at the second refresh rate, the second compensation signal CS2 can be at a turn-on level only during the compensation period (t2-t3). Therefore, when the plurality of pixels PX implement the low grayscale at the second refresh rate, the second compensation transistor CPT2 is turned on only during the compensation period (t2-t3) to apply the second compensation voltage Vcp2 to the second compensation transistor CPT2.

The second compensation voltage Vcp2 can be higher than the low potential voltage VSS.

Specifically, referring to FIG. 8, during the sensing period (t1-t2), a low potential voltage VSS of 0 V can be applied, similar to the driving period (t0-t1).

The second compensation voltage Vcp2 can be higher than the low potential voltage VSS. For example, in order to reduce the luminance of the plurality of pixels PX, the second compensation voltage Vcp2 can be 0.3 V.

For example, during the compensation period (t2-t3), the second compensation voltage Vcp2 is applied so that the voltage of the anode of the light emitting diode 150 can be increased by the second compensation capacitor CC2. However, the voltage of the anode of the light emitting diode 150 increases due to the coupling so that an increased amount of a voltage of the anode of the light emitting diode 150 is lower than an increased amount of the voltage of the cathode of the light emitting diode 150. Therefore, a voltage level applied between the anode and the cathode of the light emitting diode 150 is reduced so that the driving current of the light emitting diode 150 is reduced. As a result, when the plurality of pixels PX are driven at the second refresh rate and the video data signal RGB is a low grayscale video data signal, the driving current of the light emitting diode 150 is reduced to compensate for the output luminance of the light emitting diode 150 to be reduced.

Therefore, also in the display device according to still another exemplary embodiment (fourth exemplary embodiment) of the present disclosure, when the same low gray scale is implemented, all output luminances are maintained at a similar level both in the case of being driven at the first refresh rate and the case of being driven at the second refresh rate. As a result, in the display device according to still another exemplary embodiment (fourth exemplary embodiment) of the present disclosure, even though the refresh rate varies, the low grayscale image can be smoothly implemented.

The exemplary embodiments of the present disclosure can also be described as follows:

According to an aspect of the present disclosure, a display device can include a display panel including a plurality of pixels configured to be driven in one of a driving period and a blank period, a timing controller configured to output a variable refresh rate (VRR) signal determining a refresh rate of the plurality of pixels and a video data signal, and a data driver configured to supply a data voltage to the plurality of pixels through a plurality of data lines, according to the VRR signal and the video data signal, wherein the plurality of pixels are driven at a first refresh rate or a second refresh rate which is lower than the first refresh rate, according to the VRR signal, and when the plurality of pixels are driven at the second refresh rate and the video data signal is a low grayscale video data signal, the output luminance of each of the plurality of pixels is reduced during the blank period.

Each of the plurality of pixels can include a plurality of sub pixels. Each of the plurality of sub pixels can include a switching transistor, a driving transistor, a storage capacitor, a sensing transistor, a compensation capacitor, and a light emitting diode, where the sensing transistor is connected to the driving transistor to sense a threshold voltage and a mobility of the driving transistor, and the compensation capacitor is connected to the light emitting diode to compensate for an output luminance of the light emitting diode.

When the plurality of pixels are driven at the second refresh rate and the video data signal is a low grayscale video data signal, the blank period includes a sensing period in which the threshold voltage and the mobility of the driving transistor are sensed and a compensation period in which the output luminance of the light emitting diode can be compensated.

The compensation capacitor can include a first compensation capacitor and the first compensation capacitor can be connected to an anode of the light emitting diode and each of the plurality of data lines.

A data voltage during the compensation period can be lower than a data voltage during the sensing period.

Each of the plurality of pixels can further include a first compensation transistor connected to the first compensation capacitor, and when the plurality of pixels are driven at the second refresh rate and the video data signal is a low grayscale video data signal, the first compensation transistor applies a first compensation voltage to the first compensation capacitor.

The first compensation transistor can include a gate electrode applied with a first compensation signal, a source electrode applied with the first compensation voltage, and a drain electrode connected to the first compensation capacitor.

The first compensation voltage can be lower than a lowest level of the data voltage.

When the plurality of pixels are driven at the second refresh rate and the video data signal is a low grayscale video data signal, the first compensation signal can be at a turn-on level during the compensation period.

The compensation capacitor includes a second compensation capacitor, the second compensation capacitor is connected to an anode and a cathode of the light emitting diode, and a low potential voltage is applied to the cathode of the light emitting diode.

A low potential voltage during the compensation period can be higher than a low potential voltage during the sensing period.

Each of the plurality of pixels can further include a second compensation transistor connected to the second compensation capacitor, and when the plurality of pixels are driven at the second refresh rate and the video data signal is a low grayscale video data signal, the second compensation transistor applies a second compensation voltage to the second compensation capacitor.

The second compensation transistor can include a gate electrode applied with a second compensation signal, a source electrode applied with the second compensation voltage and a drain electrode connected to the second compensation capacitor.

The second compensation voltage can be higher than the low potential voltage.

When the plurality of pixels are driven at the second refresh rate and the video data signal is a low grayscale video data signal, the second compensation signal can be at a turn-on level during the compensation period.

When the plurality of pixels are driven at the first refresh rate or the plurality of pixels are driven at the second refresh rate and the video data signal is a high grayscale video data signal, the blank period includes only a sensing period in which a threshold voltage and a mobility of the driving transistor can be sensed.

According to another aspect of the present disclosure, a display device can include a plurality of pixels configured to be driven in one of a driving period and a blank period. The plurality of pixels can include a light emitting diode configured to emit light, a driving transistor including a gate electrode corresponding to a first node, a source electrode connected to the light emitting diode and corresponding to a second node, and a drain electrode applied with a high potential voltage, a switching transistor including a drain electrode connected to a data line, a gate electrode connected to a gate line, and a source electrode connected to the first node, a sensing transistor including a drain electrode connected to a reference voltage line, a gate electrode connected to a gate line, and a source electrode connected to the second node, a storage capacitor connected to the first node and the second node, and a first compensation capacitor connected to the data line and the second node.

A data voltage applied to the data line during the blank period can drop.

According to another aspect of the present disclosure, a display device can include a plurality of pixels configured to be driven in one of a driving period and a blank period. The plurality of pixels can include a light emitting diode which is applied with a low potential voltage to emit light, a driving transistor including a gate electrode corresponding to a first node, a source electrode connected to an anode of the light emitting diode and corresponding to a second node, and a drain electrode applied with a high potential voltage, a switching transistor including a drain electrode connected to a data line, a data electrode connected to a gate line, and a source electrode connected to the first node, a sensing transistor including a drain electrode connected to a reference voltage line, a gate electrode connected to a gate line, and a source electrode connected to the second node, a storage capacitor connected to the first node and the second node, and a second capacitor connected to the second node and a cathode of the light emitting diode.

During the blank period, the low potential voltage can rise.

Although the exemplary embodiments of the present disclosure have been described in detail with reference to the accompanying drawings, the present disclosure is not limited thereto and can be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device, comprising:

a display panel including a plurality of pixels configured to be driven in one of a driving period and a blank period;

a timing controller configured to output a variable refresh rate (VRR) signal for determining a refresh rate of the plurality of pixels and a video data signal; and a data driver configured to supply a data voltage to the plurality of pixels through a plurality of data lines, according to the VRR signal and the video data signal, wherein the plurality of pixels are driven at a first refresh rate or a second refresh rate which is lower than the first refresh rate, according to the VRR signal, when the plurality of pixels are driven at the second refresh rate and the video data signal is a low grayscale video data signal, an output luminance of each of the plurality of pixels is reduced during the blank period, wherein each of the plurality of pixels includes a plurality of sub pixels, each of the plurality of sub pixels includes:

a switching transistor, a driving transistor, a storage capacitor, a sensing transistor, a compensation capacitor, and a light emitting diode, wherein the compensation capacitor includes a first electrode and a second electrode connected to an anode of the light emitting diode, wherein, when a voltage of the first electrode of the compensation capacitor changes, a voltage of the anode of the light emitting diode corresponding to the second electrode of the compensation capacitor changes based on a change amount of the voltage of the first electrode of the compensation capacitor, wherein the sensing transistor is connected to the driving transistor to sense a threshold voltage and a mobility of the driving transistor, wherein when the plurality of pixels are driven at the second refresh rate and the video data signal is the low grayscale video data signal, the blank period includes a sensing period in which the threshold voltage and the mobility of the driving transistor are sensed and a compensation period in which an output luminance of the light emitting diode is compensated, wherein the compensation capacitor includes a first compensation capacitor, and the first compensation capacitor is connected to the anode of the light emitting diode and each of the plurality of data lines and wherein a data voltage during the compensation period is lower than a data voltage during the sensing period.

2. The display device according to claim 1, wherein each of the plurality of sub pixels further includes:

a first compensation transistor connected to the first compensation capacitor, and when the plurality of pixels are driven at the second refresh rate and the video data signal is the low grayscale video data signal, the first compensation transistor applies a first compensation voltage to the first compensation capacitor.

3. The display device according to claim 2, wherein the first compensation transistor includes:

a gate electrode applied with a first compensation signal, a source electrode applied with the first compensation voltage, and a drain electrode connected to the first compensation capacitor.

4. The display device according to claim 3, wherein the first compensation voltage is lower than a lowest level of the data voltage.

5. The display device according to claim 3, wherein when the plurality of pixels are driven at the second refresh rate and the video data signal is the low grayscale video data signal, the first compensation signal is at a turn-on level during the compensation period.

6. The display device according to claim 3, wherein the compensation capacitor includes a second compensation capacitor, the second compensation capacitor is connected to the anode of the light emitting diode and a cathode of the light emitting diode, and a low potential voltage is applied to the cathode of the light emitting diode.

7. The display device according to claim 6, wherein a low potential voltage during the compensation period is higher than a low potential voltage during the sensing period.

8. The display device according to claim 6, wherein each of the plurality of sub pixels further includes:

a second compensation transistor connected to the second compensation capacitor, and when the plurality of pixels are driven at the second refresh rate and the video data signal is the low grayscale video data signal, the second compensation transistor applies a second compensation voltage to the second compensation capacitor.

9. The display device according to claim 8, wherein the second compensation transistor includes:

a gate electrode applied with a second compensation signal, a source electrode applied with the second compensation voltage, and a drain electrode connected to the second compensation capacitor.

10. The display device according to claim 9, wherein the second compensation voltage is higher than the low potential voltage.

11. The display device according to claim 9, wherein when the plurality of pixels are driven at the second refresh rate and the video data signal is the low grayscale video data signal, the second compensation signal is at a turn-on level during the compensation period.

12. The display device according to claim 1, wherein when the plurality of pixels are driven at the first refresh rate or the plurality of pixels are driven at the second refresh rate and the video data signal is a high grayscale video data signal, the blank period includes only the sensing period in which the threshold voltage and the mobility of the driving transistor are sensed.

13. A display device, comprising:

a plurality of pixels configured to be driven in one of a driving period and a blank period, wherein each of the plurality of pixels includes:

a light emitting diode configured to emit light;

a driving transistor including a gate electrode corresponding to a first node, a source electrode connected to the light emitting diode and corresponding to a second node, and a drain electrode applied with a high potential voltage;

a switching transistor including a drain electrode connected to a data line, a gate electrode connected to a gate line, and a source electrode connected to the first node;

a sensing transistor including a drain electrode connected to a reference voltage line, a gate electrode connected to a gate line, and a source electrode connected to the second node to sense a threshold voltage and a mobility of the driving transistor;

a storage capacitor connected to the first node and the second node; and a first compensation capacitor including a first electrode directly connected to the data line and a second electrode directly connected to the second node wherein the plurality of pixels are driven at a first refresh rate or a second refresh rate which is lower than the first refresh rate, wherein when the plurality of pixels are driven at the second refresh rate and a video data signal is a low grayscale video data signal, the blank period includes a sensing period in which the threshold voltage and the mobility of the driving transistor are sensed and a compensation period in which an output luminance of the light emitting diode is compensated and wherein a data voltage during the compensation period is lower than a data voltage during the sensing period.

14. The display device according to claim 13, wherein a data voltage applied to the data line during the blank period drops.

* * * * *